United States Patent Office 3,215,649
Patented Nov. 2, 1965

3,215,649
SYNTHETIC LATEX
Donald M. Preiss, Endwell, N.Y., and Warren C. Simpson, El Cerrito, Calif., assignors to Shell Oil Company, New York, N.Y., a corporation of Delaware
No Drawing. Filed Dec. 17, 1962, Ser. No. 244,938
10 Claims. (Cl. 260—2.5)

This invention relates to improved elastomeric compositions and methods for preparing them. More particularly it relates to improved compositions of elastomeric compositions of cis 1,4-polyisoprene, the said polyisoprene being that which is produced synthetically by means known in the art.

It is well known that natural rubber latex may be treated to produce useful foamed products and dipped goods. In order to produce such products a number of essential and necessary operations are undertaken because of the nature of the raw material, that is, naturally occurring latex. Thus, for example, to naturally occurring latex is added ammonia to prevent the growth of harmful acid-producing bacteria and molds which would cause the latex to coagulate during shipping from rubber plantations. Ultimately, the ammonia must be removed before foamed products can be prepared. Furthermore, because the production of a suitable foam product is highly exacting, quality control is quite exacting mainly because each batch of naturally occurring latex may vary widely depending upon such factors as the climate, composition of the soil, age of the tree and similar vagaries that are involved in naturally occurring substances.

There are still other problems with naturally occurring rubber latex. Thus, price fluctuations and a rather high cost for the latex has resulted in the extensive use of blends of natural latex and certain synthetic rubber latices. More recently, synthetic polyisoprene having a high cis 1,4-content has been prepared commercially and some of the disadvantages existing in natural rubber are overcome by the synthetic product. Thus, the synthetic polyisoprene is much more uniform and thereby greatly simplifies quality control, while fluctuations in price are avoided and, for certain forms of the rubber, the price is considerably less. As it happens, however, there are very material differences between natural rubber and any product prepared from the synthetic cis 1,4-polyisoprenes. One difference is in the nature and amount of non-rubber constituents present, including proteins, carbohydrates, lipoids and some inorganic substances. Another difference is in the microstructure of the polymer. The polymer present in natural Hevea is essentially 100% cis 1,4-addition with substantial branching and gel contained in the product. The synthetic material, prior to any treatment, rarely exceeds 96% cis and is essentially free of branching and contains no gel. The effect of these differences may not be too apparent but when it is seen that unvulcanized films of the raw synthetic material have a tensile strength of about 100 p.s.i. compared to the 1900 p.s.i. of raw Hevea, the importance of the difference becomes more apparent. Values for other physical tests also will reflect substantial differences which truly show that the art and technology used for the natural material is not wholly suitable for the synthetic material. Furthermore, there are drastic differences between synthetic rubbers such as styrene butadiene rubbers and polyisoprene insofar as sulfur level requirements are concerned. It has been recently determined that twelve atoms of sulfur are required for a single crosslink in styrene-butadiene rubber, eight atoms of sulfur for polyisoprene and only two atoms for polybutadiene. In this description, whenever reference is made to "cis 1,4-polyisoprene" or words of similar meaning, it will be understood that the synthetic polymer is intended as distinguished from the natural rubber or naturally occurring latex.

Recently, methods for preparing emulsions and latices of cis 1,4-polyisoprene have been described. The present invention provides improvements in that the latex of the present invention is particularly suitable for the preparation of improved foamed, or cellular, products and also suitable for use in the manufacture of dipped goods where natural rubber latex has heretobefore been employed.

It is therefore an object of this invention to provide novel and improved latices of synthetic cis 1,4-polyisoprene that is free of gel and essentially free of branching. It is yet another object of this invention to provide methods for preparing the improved latices. It is also an object of this invention to provide improved foamed products from the new and improved latex and methods for preparing the novel foams from the latex which also is particularly suitable for the preparation of improved dipped goods. Other objects will become apparent as the description of this invention proceeds.

Mainly, these and other objects are accomplished by a latex of cis 1,4-polyisoprene, the polyisoprene having a cis 1,4-content ranging from about 85% to about 97% and being essentially free of branching and free of gel and further having an I.V. measured in toluene at 25° C. ranging from 1.0 to about 10.0, the latex having a solids content ranging from about 60 to 70% by weight, and more preferred from 64–68% by weight, and from 0.5 to 2 phr. (parts per 100 parts by weight of rubber) of an emulsifying agent, the latex being further characterized by a cross-link density ranging from 0.02 to $0.1 \times 10^{-4}$ moles per cubic centimeter (moles/cc). From this latex there is prepared improved foamed products by a novel process which is fully described hereinafter. The same latex may also be employed to prepare improved vulcanized dipped goods, and this also will be described hereinafter. The novel latex, briefly, is prepared from aqueous emulsions of hydrocarbon solutions of the above-described cis 1,4-polyisoprene by stripping the hydrocarbon solvent, removing water until the solids content reaches the above range, adjusting the level of the emulsifying agent to the above-indicated range of from 0.5 to 2 phr. aging the latex in the presence of from 1.5 to 2.5 phr. of a sulfur containing vulcanizing agent and from 1.5 to 2.5 phr. of a vulcanizing agent accelerator, the aging being at temperatures in excess of 40° C. for a period of time sufficient to produce a crosslink density of at least $0.02 \times 10^{-4}$ moles/cc. and not greater than $0.1 \times 10^{-4}$ moles/cc. The addition of the vulcanizing agent and the accelerator together with the aging at elevated temperatures effects a "partial" or "prevulcanization" so that the subsequent addition of more vulcanizing agent is necessary in order to produce the novel and improved foams and dipped goods which are uniquely compounded. This will also be described in greater detail later but it is noteworthy that the final product, whether it is a foamed product or a dipped product, must have a crosslink density ranging between $1.0$–$1.5 \times 10^{-4}$ moles/cc. Inasmuch as the crosslink density plays a critical role in this invention, it will be more convenient to describe this invention in the order in which the various steps and procedures are undertaken.

*The polyisoprene solution*

The polysioprene employed in the present invention may actually have a cis 1,4-content ranging from about 85 to 97% or higher. Usually, the properties of polyisoprene in the order of 85% are sufficiently inferior to that having a higher cis 1,4-content so that it will be judicious to employ polyisoprene having a cis 1,4-content at least in the order of about 90%. On the higher end of the scale, cis 1,4-polysioprene in the order of 97% or higher can be obtained only with considerable difficulty in the control of the polymerization processes so that it is more convenient and economical to compromise the maximum cis 1,4-content in the order of about 95%. In any case, it is invariably better to employ as high a cis 1,4-content as can be reasonably obtained. The polyisoprene may be prepared by any means whereby the resulting polymer is contained in solution in a diluent at the end of the polymerization. One method for producing the polymer solution is by employing catalysts and processes described in U.S. Patent 2,849,432. Another method is to use lithium alkyl catalyst alone or together with lithium metal as described in U.S. Patent 2,913,444. Still other methods are known wherein the catalyst is the reaction product of, for example, a transition metal halide wherein the metal is selected from Groups IV–VI of the Periodic Table and a strong reducing agent such as an organo-aluminum compound. In all cases, the product of polymerization is a hydrocarbon solution of the polyisoprene which has the above-described cis content, essential absence of branching and total absence of gel, or crosslinked polymer, so that the crosslink density is zero. From the polyisoprene solution the emulsions are prepared.

Emulsions of cis 1,4-polyisoprene

Basically, the emulsification procedure requires that the polyisoprene solution be emulsified in the presence of water and soap or other emulsifying agent, and this may be accomplished with any suitable emulsification apparatus including centrifugal pumps wherein elastomer solution, aqueous solutions of emulsifying agent and water are brought together and emulsified. A noteworthy characteristic of the cis 1,4-polyisoprene solution is that it usually is very viscous although the concentration of solid polymer in the solution is quite modest. Generally, the polyisoprene is contained in solution in amounts not in excess of about 25% by weight but usually more than about 5% by weight. At the higher concentration, difficulty may arise during the transfer of the polymer solution from the reactor where it is prepared. On the other hand, it is uneconomical to handle a solution having a concentration as low as 5% by weight. For these reasons, it is preferred that the concentration of the cis 1,4-polyisoprene in hydrocarbon solvent range from about 10 to about 20% by weight. The intrinsic viscosity of the polymer is of lesser importance than the concentration which may be controlled quite simply during the polymerization or by the addition of solvent which reduces the concentration. Since the emulsification step has the effect of reducing the I.V., or molecular weight, of the polymer, a suitable allowance for this should be made so that it is desirable to use polyisoprene having an I.V. in the order of 8–10 dl./gm. so that the I.V. of the polymer during subsequent processing will be in the order of 4–8, or lower. The emulsifying apparatus, the emulsifying agent and the residence time in the emulsifying apparatus are variable and these may have some effect on I.V. control. In this description, the I.V. is measured in toluene at 25° C.

The choice of emulsifying agent is not particularly critical as subsequent processing steps and procedures may be modified to accommodate the choice of emulsifying agent, and this will be readily understood by persons skilled in the art. For the sake of brevity, this description will be confined mainly to the classes of the more preferred emulsifying agents which are potassium or sodium soaps of fatty acids and rosin acids with the potassium salts being particularly preferred. The fatty acid may be any of the well known class of fatty acids. Rosin acid is partcularly preferred. Oleic acid, palmitic acid, stearic acid, lauric acid, myristic acid, castor acid and other acids, the soaps of which are well known emulsifying agents, are representative of others that may be employed. Additionally, other emulsifying agents or surface active agents may be employed such as the amine salt of a hydroxyl amine of long chain fatty acid esters, quaternary ammonium salts as tridecylbenzyl hydroxyl ethyl imidazolium chloride and the like may be employed. Nonionic surface active agents likewise are suitable such as phosphoric esters of higher alcohol such as capryl and octyl alcohol, monoesters of oleic acid and pentaerythritol, sorbitan mono-oleate and the like. It should be noted that all the hydrocarbon solvent and much of the water are ultimately removed from the emulsion and this removal may be accompanied by substantial foaming so that there are real advantages in employing the preferred emulsifying agents described above rather than adapting the procedures and processes to accommodate other emulsifying agents.

The amount of emulsifying agent is quite important mainly as it relates to the foam problems. For the more preferred soaps, i.e., the rosin acid soaps and the fatty acid soaps, the minimum suitable amount for emulsification appears to be in the order of 0.3% by weight of the water phase. With other soaps, the minimum may be as low as 0.1% by weight. Any excess above the minimum is suitable, but if too much is employed, it will need to be removed by subsequent processing as too much emulsifier may be harmful for the preparation of the improved latices and the improved foam rubbers. With these considerations in mind, the reasonable maximum of soap to employ during the emulsification step is in the order of about 5% by weight of the aqueous phase but may be in the order of 2.0% by weight in the final product. To provide a greater appreciation of various modifications and procedures that may be employed in the preparation of the emulsions, there follows a detailed description of representative emulsification procedures.

Emulsification experiments are performed in an open cylindrical vessel of 4⅝ by 9 inches. To the vessel is added first 200 milliliters of aqueous phase and then approximately 400 milliliters of elastomer solution is added. With these amounts the vessel was about one-quarter full. An Eppenbach Homomixer is lowered into the vessel within about ¼ inch of the bottom. The mixing schedule is begun with a period of ½ to 2 minutes at a slow speed, corresponding to 30–40 volts on a Variac speed controller, and then followed by a 2 to 3 minute period at full speed. In other instances, the times are longer. In making water-in-soil emulsions with very viscous elastomer solution it is found to be advantageous to raise the mixer until the bottom intakes are just within the elastomer solution rather than in the aqueous phase. With water-in-oil emulsions the periods of relatively slow mixing are less successful and erratic. In many instances, the time of about 3 minutes is adequate to produce emulsions which do not change appreciably in particle size with further mixing, and this is particularly true with the emulsions which form directly in the fluid elastomer solutions. On the other hand, for the oil-in-water emulsions which form after inversion, there is some decrease in the particle size on continued mixing. In general, the temperature of the mixture during the emulsification process is not important, and as the emulsification continues there will be a temperature rise which has no significant effect either on the emulsification or on the properties of the final product. In general, the volumetric phase ratio of elastomer solution to water is held constant at about 2:1 although it may range from about 3:1 to about 1:10 or higher.

Table I illustrates the effect of various soaps on the emulsification of cis 1,4-polyisoprene in hexane. The cis content of the polyisoprene is 92.5%; the rosin acid soap, "Dresinate 214," is a product of Hercules Powder Co.; "KOL" is potassium oleate added as oleic acid to the elastomer solution; NaFA is sodium fatty acids; the soap/rubber ratio is a volumetric phase ratio of about 2.0. The characteristics of the emulsion are an arbitrary standard based on visual observation and are based on particle size as shown by photomicrographs, the appearance of the emulsion after high dilution for microscopic observations, and the amount of foam produced on emulsification. Some aspects of the formation of the latices are also shown although the discussion of the preparation of latices appears later.

TABLE I

| Experiment | 29 | 30 | 33 | 34 | 35 | 37 | 38 | 27 |
|---|---|---|---|---|---|---|---|---|
| Elastomer conc., percent w | 12.4 | 12.4 | 12.4 | 14.9 | 14.9 | 11.9 | 12.3 | 12.4 |
| Soap conc., percent w.: | | | | | | | | |
| Dresinate 214 | ½ | ¼ | ¼ | | ¼ | ½ | ¾ | 1 |
| KOL | ½ | ¾ | ½ | ½ | ½ | ½ | | |
| NaFA | | | | ¼ | | | | |
| Soap/rubber, g./100 g | 6.8 | 5.8 | 4.1 | 3.1 | 2.9 | 3.9 | 4.2 | 5.6 |
| Phase ratio a | 1.18 | 1.38 | 1.48 | 1.64 | 1.75 | 1.60 | 1.45 | 1.45 |
| Characteristics of emulsion | E | E | E | F | F | G | E | E |
| Foam on stripping | | High | High | | | High | Med | Med |
| Solids in latex, percent w | | 14.0 | 15.1 | | | 15.9 | 15.2 | 15.0 |
| Coagulum, percent w. of rubber | | 4.2 | 0.3 | | | 1.3 | 2.5 | 1.8 |
| Polymer IV, dl./g | 7 | 7 | 7 | 6.2 | 6.2 | 6.2 | 6.2 | 7 | a Weight polymer solution/weight soap solution; approximately a volumetric phase ratio of 2.
E=Excellent; G=Good; F=Fair.

In general, the presence of macroscopic droplets of rubber solution in the emulsions, i.e., droplets in the order of about 25 or more microns, is considerably less desired and is taken as a criterion of a less satisfactory emulsion, and in the above table only the better emulsions were stripped to prepare latices.

Table II illustrates the effect of elastomer concentration of the emulsification of the polyisoprene solution in hexane. The soap is "Dresinate 214."

TABLE II

| Experiment | 44 | 38 | 42 | 75 | 80 | 40 | 49 | 39 |
|---|---|---|---|---|---|---|---|---|
| Elastomer IV | 6.2 | 6.2 | 2.3 | 2.3 | 2.3 | 2.3 | 2.3 | 2.3 |
| Elastomer solution: | | | | | | | | |
| Viscosity, poises | 4 | 210 | 3 | 4 | 53 | 135 | 135 | 476 |
| Conc., percent w | 5.7 | 12.3 | 11.5 | 12.0 | 21.7 | 26.7 | 26.9 | 32.2 |
| Soap solution conc., percent w | ¾ | ¾ | ¾ | ¾ | ¾ | ¾ | ¾ | ¾ |
| Wt. phase ratio, o/w | 1.52 | 1.45 | 1.35 | 1.41 | 1.37 | 1.28 | 1.47 | 1.50 |
| Initial emulsion | o/w | o/w | o/w | o/w | a o/w | mixed | mixed | mixed |
| Initial foaming b | 1.5 | 2 | 2 | 1.5 | 2 | 3 | 3 | 3 | a Emulsion was coarse.
b Estimated final foam volume/initial volume.

From the above, it will be seen that the emulsification procedures may vary widely. It is noteworthy, however, that the particle size of emulsion should be in the order of 0.2 to 20 microns and the solids content should be less than about 20% by weight.

*Preparation and characteristics of the latex*

From the aqueous emulsions, the improved latices of this invention are prepared. First, the solvent is removed from the emulsion and this may be accomplished by any of a number of techniques which basically involve a stripping operation in any suitable type of flashing apparatus. Since foaming will be most troublesome at this point, the apparatus should be designed and equipped with that in mind. It is found that the solvent is suitably stripped from the emulsions by the use of flashing apparatus in the form of a flask, or a similar piece of apparatus, attached to a vertical column with a side arm at the top leading to a condenser; the column serves to contain foam. Desirably the container holding the emulsion and the top and bottom portions of the column are heated. If desired, heated nitrogen at temperatures in the order of 40–80° C. may be bubbled into the emulsion through a sintered disc. Steam may be used in place of the nitrogen and is generally equally suitable. The stripping operation is suitably conducted at temperatures within the vessel containing the emulsion in the order of 25–70° C.; the column temperature may range from 30–50° C. at pressures ranging from atmospheric to about 15 inches of Hg vacuum. After the hydrocarbon solvent is separated, the resultant dilute latex, which may contain from 5 to 30% solids, is further treated to increase the solids content to the necessary range by separating water. The concentration of the latex may be accomplished by any suitable means, such as creaming with creaming agents but a particularly preferred method of concentrating the dilute latex is by centrifuging.

As a representative illustration, a latex containing in the order of 14.7% solids after the removal of the hydrocarbon solvent can be conveniently concentrated to about 67% by weight in about 10 minutes using 3400 gravity. Higher concentrations of solid may be obtained at longer times, but the matter of cost becomes more pronounced at this stage. As a result of removal of the hydrocarbon solvent from the emulsion drops, their size is reduced to the range of about 0.1 to 10 microns in diameter, with a weight median diameter of about 1 micron. The polyisoprene in the latex still is essentially free of branching and free of gel, or crosslinking. The I.V. of the polymer is somewhat lower than the I.V. of the starting material as a result of the shearing action in the emulsification step and the cis content remains essentially unchanged. According to the present invention, the latex is treated so as to introduce a critical amount of crosslinking which is from about 0.02 to $0.1 \times 10^{-4}$ moles/cc. The drop in tensile strength and elongation of foam which occurs when too high a level of crosslinks is introduced during maturation is believed to be a result of the influence of polymer properties on particle coalescence in the gelation process. Latex particles with too high a crosslink density and resistance to flow may not coalesce readily and completely, and the resulting decrease in the area of particle to particle contacts leads to avoid spaces as sites of weakness resulting in a reduction in overall tensile strength.

Basically, the method for introducing crosslinking into this gel-free latex involves a critical prevulcanization with sulfur or a sulfur-containing vulcanizing agent and preferably with a vulcanizing agent accelerator. Because the crosslink density of the prevulcanized latex is critical, methods of determining the extent of prevulcanization are also provided by the instant invention. In any case, of the total amount of vulcanizing agent that is ultimately needed, part is withheld at this stage and only a portion of the vulcanizing agent is employed in the prevulcanization. It is not particularly material what the vulcanizing agent is or what vulcanizing accelerators are selected providing the crosslink density is held within the essential range. All that is required is that the sulfur-containing vulcanizing agent and the optional vulcanizing agent accelerators be added in the amounts previously indicated, mixed into the latex and the mixture caused to react at elevated temperatures until the desired crosslink density is obtained. To illustrate the controlled crosslinking technique that may be employed, the following example is provided.

EXAMPLE I

For this illustration, the polyisoprene has a cis 1,4-content of 93.6%, an I.V. of 6.5 dl./g., a solids content of 13.2% by weight, and contains about 1% by weight of an antioxidant. To 100 parts of latex, based on solids, are added 0.5 phr. of sulfur and 0.75 phr. of zinc diethyldithiocarbamate as finely divided dispersions in water. The sulfur and vulcanizing agent accelerator are blended into the concentrated latex for several minutes after which the total blend is caused to react in a controlled manner at elevated temperatures for varying periods of time. Periodic samples are withdrawn and the crosslink density is determined from swelling of film specimens in normal heptane at 25° C. from which it is established that temperatures in the order of about 40° C. may require about 72 hours to produce the necessary crosslink density whereas temperatures in the order of 50° C. cause a substantial reduction in reaction time, i.e., in the order of about 16 hours. The time and temperature may be varied somewhat but, in any case, the sole criterion of suitability of the extent of the reaction is, as indicated above, the critical range of crosslink density of the latex. The effect of time and temperature on the crosslink density and swollen diameter is shown in Table III.

TABLE III

| 40° C. | | 50° C. | | |
|---|---|---|---|---|
| Time, hours | Swollen diameter, inches | Time, hours | Swollen diameter, inches | Crosslink density, $10^{-4}$ moles/cc. |
| 0 | (a) | 0 | (a) | |
| 2 | (a) | 1.5 | (a) | |
| 4 | (a) | 16 | 2.9 | 0.03 |
| 24 | (a) | 18 | 2.7 | 0.04 |
| 72 | 3.0 | 21 | 2.5 | 0.06 |
| | | 24 | 2.5 | 0.06 | a Disintegrated.

The crosslink density calculations are then made by the relationship to the volume fraction, $V_r$, of polymer in the swollen state by the Flory-Rehner equation as described in J. Chem. Phys., 11, 521 (1943). The formula is as follows:

$$v = \frac{1}{V_s} \cdot \frac{\ln(1-V_r) + V_r + \mu V_r^2}{V_r^{1/3} - \frac{2V_r}{f}}$$

$V_s$ is the molal volume of the solvent used, the functionality of the crosslinks, $f$, is taken as 4, and $\mu$ is the Huggins solubility parameter for the solvent-polymer pair. The value of $\mu$ is also a function of $V_r$ (i.e., $\mu = \mu_0 + \beta V_r$) and may be calculated from values of $\mu_0$ and $\beta$ which are found by determining the stress-strain modulus of the swollen polymer in a fashion described by Gee in Trans. Faraday Soc., 42A, 33; 42, 585 (1946); $V_r = $ (original diameter/swollen diameter) [3]. The values of the required cross-link densities take into account the nonrubbery constituents contained in the latex and a discussion of the extensive calculations involved are not undertaken here. It is sufficient to mention, however, that the influence of the nonrubbery constituents on the crosslink density is found to be negligible and is therefore neglected. The solubility parameter for the present polyisoprene with heptane at 25° C. uses $V_s = 147.49$; $\mu_0 = 0.46$, and $\beta = 0.20$.

It will be apparent that the time required to reach the needed crosslink density, as indicated by the swollen diameter, appears to be long. The time, however, may be reduced by increasing the temperature but temperatures in excess of about 65–70° C. are not recommended as the latex may begin to show some degradation due to such heat treatment. The time also may be reduced by increasing the amount of curing agent and the accelerator and, in some cases, sulfur-containing vulcanizing agents may be usefully employed in order to reduce the time required to reach the needed crosslink density. In general, however, the controlled crosslinking process will require in the order of at least several hours.

The swelling data is interpreted in terms of crosslink density after the swelled specimen reaches equilibrium. The films for use in the crosslink density measurements are prepared from the concentrated latex having the required solids content by first diluting the latex to a 50% solids with distilled water and then filtering through gauze to remove traces of coagulum. Aqueous dispersions of sulfur and of vulcanizing agent accelerator, as 50% solution, by weight, are added to 100 grams of latex contained in a beaker with mild mechanical agitation which avoids the entrapment of air. Mixing is for about 15 minutes before film preparation. The compounded latex is placed under vacuum of 25 inches Hg at room temperature and vibrated to ensure removal of last traces of air bubbles. Samples of latex are withdrawn with a pipet and transferred to a 6" x 16" rectangular plate. Films three-inches wide are doctored to a thickness of 0.045 inch and the plates are placed on a level table in a constant temperature atmosphere of 74° F. and constant humidity of 50% for 16 hours. Circular discs 1.13 inches in diameter are stamped from the dry films and allowed to swell in n-heptane at room temperature and the diameter is noted after equilibrium is reached, which usually occurs within 30 minutes.

The specimens that disintegrate are obviously unsuitable. After extensive investigation and statistical analysis, it is determined that when the swollen diameter is 2.2 to 3.0 inches at equilibrium, the resulting product will have the needed range of crosslink density. If the swollen specimen is not in this range at equilibrium, then the reaction conditions for pre-crosslinking must be modified. It will be appreciated by persons skilled in the art that procedures for determining the swollen diameter is merely one suggested method and other methods and procedures may be employed. However, the swollen diameter is, essentially, a tool for determining the crosslink density of the latices and the latter is the controlling value.

The latex has other characteristics which may be correlated to unvulcanized and vulcanized films prepared from the latex. Thus, measurements of the tensile strength, elongation and modulus may be made and correlated to the crosslink density and this is illustrated in Table IV wherein the polyisoprene is the same as in Example I above.

TABLE IV.—STRESS-STRAIN PROPERTIES OF UNVULCANIZED POLYISOPRENE FILMS
[Microdumbells tested at 20 inches per minute, 74.5° F.]

| Crosslink density moles/cc.×$10^{-4}$ | Tensile strength, p.s.i. | Elongation, percent | Modulus, p.s.i. | |
|---|---|---|---|---|
| | | | 300% | 500% |
| .00 | 100 | 2,000 | nil | nil |
| .02 | 200 | 1,300 | 40 | 70 |
| .04 | 320 | 1,220 | 50 | 80 |
| .06 | 460 | 1,150 | 60 | 90 |

*Dipped goods*

Dipped goods, such as rubber thread, having improved physical properties can also be prepared from the latices of the present invention. The latices, as indicated above, have the essential range of crosslink density of 0.02 to 0.1×$10^{-4}$ moles/cc. measured as described above. The formulations for dipped goods are essentially the same as those used for foam rubber with the exception that frothing aids, and the gelling agents, i.e., sodium silicofluoride, are omitted. The compounds are sulfur-cured gum stocks with suitable accelerators such as zinc dialkyldithiocarbamate and zinc mercaptobenzothiazole. Zinc oxide is used as an activator and other ingredients may be added to improve processing such as viscosity improvers, soaps, antioxidants and the like. The pH, in most cases, should be adjusted with alkali, e.g., potassium hydroxide, to a value of about 8–11 with 9–10 being preferred. Rapid cures in atmospheric steam may be easily obtained. The physical properties of the final vulcanized product can vary greatly by varying the formulation. The most suitable products are obtained when the crosslink-density of the vulcanizate is between about 1.0 to $1.5 \times 10^{-4}$ moles/cc. The crosslink density of dipped goods may be determined by conventional means and it will be observed that articles of high or low modulus can be made by controlling the crosslink density within the above range as well as by varying the quantity of zinc oxide.

Polyisoprene foam

From the polyisoprene latex described above, the improved foam products may be prepared. It should be pointed out, first, that the preparation of a cellular product from an elastomeric latex is not particularly difficult in view of the highly developed state of the art. The problem insofar as foam elastomers are concerned is to produce products which not only have suitable cell structure but also have desirable and necessary properties. Thus, if the techniques applied to the preparation of foams from natural Hevea latex are used on the novel latex of the present invention, foamed products may be obtained which are considerably inferior compared to foam products of the present invention.

The above-described introduction and control of crosslinking into the latex is one facet which aids considerably in the production of the improved foams of this invention and it is noted that the final products have considerably improved retention of uniform cell structure and much improved physical properties when the latex has the required crosslink density. The crosslink density of the latex is also extremely important in the preparation of dipped goods and this aspect of the invention was described in greater detail above. A few of the physical properties that are important insofar as the foams are concerned include the compression deflection, tensile strength, elongation, compression set, shrinkage, and cell structure. The present invention provides substantial improvement in these physical properties in addition to which the foams prepared according to the present invention do not exhibit an undesirable pinchiness or "cell wall tack." Cell wall tack is manifested by slow recovery of the foam rubber from severe compression which is simply illustrated by pinching the foam product with the fingers. It is found that the cell wall tack cannot be eliminated by the mere variation in the species and amounts of ingredients used in the usual foaming formulation. To illustrate this better, Table V sets forth part of a typical formulation employed in the preparation of the novel foams.

TABLE V

| | Range | Preferred |
|---|---|---|
| Latex (Crosslinked for 24 hours at 50° C.): | | |
|   Polymer (incl. 2.0 phr. Dresinate 214 and 1.5 phr. potassium oleate) | 100.0 | 100.00 |
|   Sulfur or sulfur-containing vulcanizing agent, phr | 0.25–0.75 | 0.50 |
|   Zinc diethyldithiocarbamate, phr | 0.50–1.0 | 0.75 |
|   Stabilizer (alkylated phenol), phr | .50–1.5 | 1.00 |
| Foaming formulation: | | |
|   Matured latex, phr | ca. 101.25–103.25 | 102.25 |
|   Vulcanizing agent (as above), phr | 1.5–2.5 | 2.00 |
|   Zinc diethyldithiocarbamate, phr | 0.25–0.75 | 0.50 |
|   Zinc mercaptobenzothiazole, phr | 1.25–1.75 | 1.50 |
|   Methyl cellulose, phr | 0.20–0.60 | 0.40 |
|   Trimene base, phr | 0.50–1.50 | 1.00 |

The compounded latex is frothed in, for example, a Hobart kettle, refined for a few minutes after which about 3–7 phr. (preferably 5) of zinc oxide is added, followed by further refining. Thereafter, 1.0 phr. sodium silicofluoride diluted from 53% to 25% with 0.1 normal potassium hydroxide is added. The fully compounded foam is then mixed for one minute, poured into a mold and allowed to gel at room temperature. The gel time varies, but with the above preferred formulation gelling occurs in about 3 to 7 minutes. After gelation, the foam is placed in a steam oven at 100° C. whereupon vulcanization takes place, after about 30 minutes. The physical properties of the resulting foam can then be evaluated and Table VI compares data for two specimens of cis 1,4-polyisoprene foam and a foam prepared from a typical Hevea latex.

TABLE VI

| Polymer | Polyisoprene | | Hevea |
|---|---|---|---|
| Run No | I | II | III |
| Controlled crosslinking conditions | (a) | (b) | (c) |
| Crosslink density in latex, moles/cc. $\times 10^{-4}$ | 0 | 0.06 | 0.03 |
| Foam density, gram/liter | 100 | 100 | 100 |
| Compression deflection, p.s.i.: | | | |
|   25% | 0.30 | 0.54 | 0.5 |
|   50% | 0.66 | 1.22 | 1.20 |
| Tensile strength, p.s.i. | 13.6 | 10.0 | 14.0 |
| Elongation, percent | 240 | 100 | 280 |
| Compression set, percent | 23 | 10.3 | 16 |
| Shrinkage, percent | 10 | 36 | 20 |
| Cell structure | Poor | Excellent | Excellent | a 24 hr. at 25° C.  b 24 hr. at 50° C.  c 16 hr. at 40° C.

When Run No. II is repeated, adding all the sulfur prior to maturation, the resulting foam has drastically reduced tensile strength and poor cell structure.

For the polyisoprene specimens, substantial differences in both the structure and compression deflection properties are obtained and the shrinkage for the preferred specimen II will be observed to be quite severe. Additionally the foams from I and II exhibit severe cell wall tack. In a series of extensive experiments, the compound ingredients and vulcanizing conditions for specimens similar to Runs I and II are modified. The changes in the vulcanizing agent, the accelerators, soaps and other compound ingredients do not aid in improving the cell wall tack. From this investigation, it is established that the degree of tack is inversely proportional to the crosslink density, and by appropriately changing the vulcanization conditions, one can eliminate entirely the cell wall tack. However, the elimination of the tack by this means alone can be accomplished only by producing a foam product having an unbearably low tensile strength and/or requiring impractical curing conditions.

It is found that a wholly suitable foam product of cis 1,4-polyisoprene is obtained when the above representative formulation is modified to contain additionally from 1.0 to 5.0 phr. of a wax. The wax is not particularly critical and may be selected from natural or synthetic waxes of which numerous species are known in the art, providing the wax is essentially free of blocking. Among the preferred waxes there may be mentioned the so-called "heavy distillate waxes" having melting points ranging from 142–185° F., and the so-called "HMP" or "high melting point waxes" having melting points ranging from 180–185° F. Although the waxes that are essentially free of blocking tendencies will serve the same function, it is particularly preferred that the wax composition should have a melting point above about 120° F. but below 212° F., which is the steam temperature during vulcanization. If suitable modifications are undertaken in formulations and curing conditions, other waxes may also be suitable. A representative synthetic wax includes any of the class of hydrogenated oils such as castor oil and other high molecular weight oils. In addition to the previous features described, the improved foamed products of this invention are characterized by a crosslink density ranging from 1.0 to $1.5 \times 10^{-4}$ moles/cc. This critical value is required to provide a foam product which is wholly acceptable both from the aspect of properties, performance and suitability of preparation.

To better illustrate that aspect of the invention which embraces the need for wax, comparative illustrations are provided wherein the wax has a melting point of 124–126° F. It is added as a 30% aqueous emulsion to the foaming formulation given in Table IV. The same formulations and foaming procedures are used for the three comparative experiments. The wax employed in the following table is a distillate paraffin wax having a melting point of about 123° F. which is modified with 10% of oleic acid, but other waxes of the type previously described are suitable.

| Run No. | 1 | 2 | 3 |
|---|---|---|---|
| Wax, p.h.r. | 0 | 3 | 3 |
| Precrosslinking time, hrs. at 50° C. | 18 | 18 | 0 |
| Prevulcanization crosslink density, $\times 10^{-4}$ moles/cc. (v.) | 0.02 | 0.02 | 0.00 |
| Gel time, minutes | 5.5 | 6.5 | 8 |
| Density, g./liter | 100 | 100 | 100 |
| Compression deflection, p.s.i.: | | | |
| 25% | 0.41 | 0.47 | 0.19 |
| 50% | 0.93 | 1.00 | 0.52 |
| Tensile strength, p.s.i. | 8.0 | 12.3 | 12.2 |
| Elongation, percent | 210 | 200 | 290 |
| Compression set, percent | 7.6 | 12.5 | 14.9 |
| Volume fraction ($V_r$) | .353 | .317 | .316 |
| Final crosslink density, $\times 10^{-4}$ moles/cc. (v.) | 2.1 | 1.51 | 1.50 |
| Shrinkage, percent | 11 | 11 | 10 |
| Degree of cell wall tack | Extreme | None | None |
| Structure | Fine | Fine | Coarse |

In a series of companion experiments, it is determined that variations in the formulations, without the wax, will always result in a foam having the severe cell wall tack. Using wax and varying the proportions of the formulating ingredients, the crosslink density may be affected. Thus, lowering the accelerator content, as zinc diethyldithiocarbamate, from 1.5 to 1.25 has no significant effect on the crosslink density; lowering the level of, e.g., zinc mercaptobenzothiazole from 1.5 to 1.0 does lower the crosslink density noticeably but the amount of change is not important providing the crosslink density still falls within the required range.

Particularly significant is the observation that the presence of the wax will produce a tack-free foam from latex that is not pre-crosslinked, but when that is done the cell structure is coarse and the physical properties, particularly the compression deflection, are much inferior so that the final product is less suitable. Also particularly noteis that the shrinkage is greatly reduced, and this is still another advantage afforded by the present invention. The reason for the improvement in shrinkage is not fully understood.

The formulations illustrated above may be modified in other ways by the addition of pigments, lubricants, reinforcing materials, and the like, without affecting any material departure from the present invention. This may be illustrated by the use of, for example, supplementary accelerators such as a mixture of lecithin-triethanol amine (95:5) which, in addition to functioning as a supplementary accelerator, also assists in the reduction of the cell wall tack.

*Crosslink density of the foams*

Persons skilled in the art know that crosslink density values have never been applied, heretofore, to foam rubbers. The reason for this is that no suitable means was available for such determinations because the determination of the crosslink densities of a rubber sample requires the immersion of the sample in a hydrocarbon solvent for various periods of time after which the specimen is wiped dry and weighed. Foamed rubbers which have been immersed in hydrocarbon solvent cannot be suitably wiped of excess solvent and weighed because of adsorption and evaporation. Because the crosslink density of the present foamed rubber is critical, the instant invention also provides a method for determining the crosslink density of the foam product of this invention as well as other foamed or cellular rubbers. If the crosslink density of the foam specimen is not within the above-indicated range, then the product is less suitable so that modifications in the formulations and vulcanizing cycles must be undertaken in order to provide the required crosslink density. The method for determining the crosslink density of the foam is described below, but persons skilled in the art will readily appreciate that modifications in the methods may be undertaken although the ultimate result is the same.

When a solvent is added to a piece of the cured foam rubber of this invention, swelling equilibrium is attained practically instantaneously. Although the solvent is not particularly critical or controlling, for the purposes of this description, n-heptane is employed. The specimens of foam rubber are suitably cylinders of 1 3/16 inches in diameter stamped from larger samples with a Kenco two-ton press. The height of the specimen varies from 3/4 to 1 inch depending on the thickness of the original foam rubber sheet. The initial dimensions, of course, of the specimen are easily determined to ±0.001 mm., but it is very difficult to measure swollen dimensions of the cylindrical test pieces because they float irregularly in the solvent owing to the presence of small amounts of trapped air. Accordingly, after swelling, the test piece is immobilized by impaling it with two common pins thrust upward through a piece of steel gauze placed in the bottom of a two-inch deep petri dish used to hold the solvent. The height and diameter are measured both before and after swelling using two Gaertner cathometers, one with vertical travel and the other with horizontal travel. Before swelling, marks are made with ink on the edges of the piece and these serve to define the measurement locations. Thus, these marks are used only to locate the traverse of the cathometers; the actual points of measurement are always to an edge of the specimen. The particular means employed to immobilize test specimens is not important and other means will be readily suggested as one becomes more familiar with the procedure. Thus, for example, an improved mounting platform may be constructed with leveling screws with a circular plate that fits inside a suitable vessel such as the 4-inch petri dish. In the center of the plate, two pins may be mounted for attaching the swollen specimen.

As it is necessary for the specimen to reach swelling equilibrium, a series of measurements may be made starting as soon as possible after immersion of the specimen in the solvent. About 1½ minutes may be needed to line the specimen up in the field of the cathometer. By periodic measurements of the diameter of the swollen diameter, the calculation of the volume fraction, $V_r$, can then be determined according to the equation $V_r = $(original diameter/swollen diameter)$^3$. If the above procedures for determining the volume fraction of the swollen mass are followed, it will be found that equilibrium is attained in less than 2 minutes of immersion, but it is recommended that about 2 to 3 minutes of immersion be allowed in order to establish a sufficient time for the specimen to reach equilibrium. Extensive investigation of the $V_r$ is found to have a maximum error of measurement of ±0.25% due mainly to the mechanical difficulty of measurement through a liquid-air interface and the difficulty of focusing the measuring apparatus on a somewhat fuzzy object, i.e., the magnified edge of the mark previously made with ink. The crosslink density is then determined using the Flory-Rehner equation previously described in relation to the crosslink density of the latex.

Because of the preparation of the latex, foamed products and dipped goods involve several variables, the present invention is particularly capable of rather wide modification, particularly in the formulations wherein equivalent materials may be used instead of those mentioned. Thus, instead of using sulfur as the vulcanizing agent, the invention may be modified so as to employ other vulcanizing agents as selenium, selenium diethyl dithiocarbamate, tetraethyl thiuram disulfide, alkyl phenol disulfide, tellurium and various compounds thereof, dioximes as p-quinone dioxime and the like. As it happens, sulfur is very suitable and inexpensive. The same applies also to any of the hundreds of accelerators that are available. Such changes in formulations may cause minor variations in the properties of the products and may in turn require that other modifications in the preparation be adopted, such as changes in gel times, curing cycles and the like. Still other modifications may be adopted such as blending the present latices with other latices to produce products that have varying physical properties. Additionally, fillers, reinforcing agents, and the like, may be incorporated into the latex in order to obtain still other modifications in the properties. These modifications and others will be readily understood by persons skilled in the art and may be adopted without departing from the spirit of the invention.

This application is a continuation-in-part of copending application Serial No. 124,016 which was filed July 14, 1961, now abandoned.

We claim as our invention:

1. A latex of cis 1,4-polyisoprene produced by solution polymerization, the polyisoprene having from about 85 to 97% of cis 1,4-addition, having an I.V. of 1 to 10.0 and being essentially straight chain polymer having a cross-link density of 0 prior to emulsification, the latex having a solids content ranging from 60 to 70% by weight and containing from 0.5 to 2 phr. of an emulsifying agent and having a crosslink density ranging from 0.02 to $0.1 \times 10^{-4}$ moles per cubic centimeter.

2. The latex of claim 1 wherein the emulsifying agent is rosin acid soap.

3. The latex of claim 1 wherein the emulsifying agent is a fatty acid soap.

4. The process comprising emulsifying a hydrocarbon solution of synthetic polyisoprene having from about 85 to 97% of cis 1,4-addition product, the polyisoprene having an I.V. from 1.0 to 10.0 and being essentially straight chain polymer having a cross-link density of 0, the emulsification being conducted in the presence of water and an emulsifying agent, thereafter separating the hydrocarbon solvent, concentrating the resultant dilute latex by removing water until the latex contains from 60 to 70% by weight of solids, adjusting the level of the emulsifying agent to 0.5 to 2 phr. adding to the concentrated latex from 0.25 to 0.75 phr. of a sulfur-containing vulcanizing agent and from 0.5 to 1.0 phr. of at least one vulcanizing agent accelerator and reacting the resultant latex at temperatures in excess of 40° C. until the crosslink density of the latex reaches from 0.02 to $0.1 \times 10^{-4}$ moles per cubic centimeter.

5. The process of claim 4 wherein the emulsifying agent is a fatty acid soap.

6. The process of claim 4 wherein the emulsifying agent is rosin acid soap.

7. The process of foaming and vulcanizing a latex of polyisoprene prepared by solution polymerization, the polyisoprene initially having from about 85 to 97% of cis 1,4-addition, an I.V. of 1 to 10.0 and being essentially straight chain polymer having a cross-link density of 0, the latex having a solids content ranging from 60 to 70% by weight, containing from 0.5 to 2 phr. of an emulsifying agent and having a crosslink density ranging from 0.02 to $0.1 \times 10^{-4}$ moles per cubic centimeters, the said process comprising blending the latex with from about 1.5 to about 2.5 phr. of a sulfur-containing vulcanizing agent, from about 1.5 to 2.5 phr. of at least one vulcanizing agent accelerator, from about 0.20 to 0.60 phr. of a thickening agent and from about 0.50 to 1.0 phr. of a foam stabilizer, frothing the said blend and adding about 3.0 to 7.0 phr. of zinc oxide, sufficient gelling agent to effect gelation in less than about 10 minutes at room temperature, and up to 5.0 phr. of a member selected from the group consisting of wax and a mixture of lecithin and triethanol amine, thereafter vulcanizing the froth in steam and recovering a vulcanized foamed product having a final crosslink density ranging from 1.0 to $1.5 \times 10^{-4}$ moles per cubic centimeters measured in heptane at 25° C.

8. The process of claim 7 in which the emulsifying agent is rosin acid soap.

9. The process of claim 7 in which the emulsifying agent is fatty acid soap.

10. The process of claim 7 in which the vulcanizing agent is sulfur.

References Cited by the Examiner

UNITED STATES PATENTS

| 2,539,931 | 1/51 | Rodgers et al. | 260—2.5 |
| 2,640,087 | 5/53 | Borton | 260—2.5 |
| 2,643,233 | 6/53 | Bennett et al. | 260—2.5 |
| 2,653,918 | 9/53 | Eckert | 260—2.5 |
| 2,676,928 | 4/54 | Frank | 260—2.5 |
| 2,801,274 | 7/57 | Bethe | 260—2.5 |
| 2,979,488 | 4/61 | Carpenter | 260—94.7 |

OTHER REFERENCES

"Available Synthetic Rubber Latices," Rubber World, vol. 143, No. 6, March 1961, pages 71–77.

MURRAY TILLMAN, *Primary Examiner*.

JAMES A. SEIDLECK, *Examiner*.